United States Patent [19]

Dennis

[11] 4,319,345
[45] Mar. 9, 1982

[54] ACOUSTIC WELL-LOGGING TRANSMITTING AND RECEIVING TRANSDUCERS

[75] Inventor: John R. Dennis, Duncan, Okla.

[73] Assignee: Halliburton Company, Duncan, Okla.

[21] Appl. No.: 152,979

[22] Filed: May 23, 1980

[51] Int. Cl.³ .................... G01V 1/40; G01V 1/143
[52] U.S. Cl. ................................ 367/25; 367/158; 367/912; 181/104; 181/106; 310/317; 310/335
[58] Field of Search ............... 367/25, 158, 912; 181/102, 104, 106, 401; 29/594; 310/335, 317

[56] References Cited

U.S. PATENT DOCUMENTS

| | | | |
|---|---|---|---|
| 2,825,044 | 2/1958 | Peterson | 181/104 |
| 2,988,728 | 6/1961 | Marlow | 367/158 |
| 3,496,533 | 2/1970 | Semmelick | 181/104 |
| 3,504,759 | 4/1970 | Cubberly | 181/104 |
| 3,539,980 | 11/1970 | Massa | 367/157 |
| 3,541,502 | 11/1970 | Behrendt et al. | 367/158 |
| 3,769,532 | 10/1973 | Tocquet et al. | 357/158 |
| 3,860,901 | 11/1975 | Ehrlich et al. | 367/157 |
| 3,974,476 | 8/1976 | Cowles | 181/104 |
| 4,031,418 | 6/1977 | Chizel et al. | 367/158 |
| 4,184,562 | 1/1980 | Bakamjian | 367/86 |

FOREIGN PATENT DOCUMENTS

| | | | |
|---|---|---|---|
| 2121236 | 12/1971 | Fed. Rep. of Germany | 367/158 |
| 265804 | 12/1968 | U.S.S.R. | 181/102 |
| 363952 | 2/1973 | U.S.S.R. | 181/104 |
| 533896 | 10/1976 | U.S.S.R. | 181/104 |

OTHER PUBLICATIONS

"The Design of Piezoelectric Sandwich Transducers", Apr. 31, 1972, Engineering Report of Vernitron Piezoelectric Division, TP 235.

Primary Examiner—Nelson Moskowitz
Attorney, Agent, or Firm—John H. Tregoning; William J. Beard

[57] ABSTRACT

An acoustic well-logging transmitting transducer employing a transmitter portion comprising stacked piezoceramic rings and a resonating metallic plate, the dimension of which determines the frequency, and a conical acoustic reflector for causing reflections to impinge omnidirectionally on the wall of the borehole at an angle to enhance shear wave component propagation. A receiving portion of similar construction can also be employed.

7 Claims, 3 Drawing Figures

ACOUSTIC WELL-LOGGING TRANSMITTING AND RECEIVING TRANSDUCERS

BACKGROUND OF THE INVENTION

1. Field of the Invention

This invention pertains to acoustic well logging and more particularly to the development of an acoustical logging signal that will enhance a preselected component of an acoustical wave induced into a formation borehole during a well-logging operation.

2. Description of the Prior Art

Acoustical well logging has long been a particularly satisfactory means for developing valuable information about various formation anomalies and interfaces. However, it is also well-known that compressional acoustic well logging is a much easier technique to utilize than well logging utilizing other acoustical waves, because compressional waves are normally larger in amplitude than shear wave components. In addition, they travel faster along a formation path, and therefore arrive earlier at receivers located for detecting reflected and refracted waves than other components (and, hence compressional waves are not so subject to noise or being hidden in reverberations). However, other wave components of acoustical waves do contain information that may not be included in data derived from the use of compressional waves. For example, one of the other wave fronts that yields valuable information is the shear wave front.

A shear wave is developed in a formation as a result of oscillatory reverberations in a medium at right angles to the direction of travel of the wave, which is in contradistinction to a compressional wave. The stiffness of the medium determines how well the medium sustains shear wave propagation, whereas the medium stiffness has less effect on supporting compressional wave propagation. Hence, one popular use of shear wave logging is in the detection of formation fractures, where liquids, gases and spaces occur.

It is also true that a particular rock type of structure produces a characteristic trace as a result of compressional wave logging, and another characteristic trace as a result of shear wave logging. The lithological characteristics of various rock types can be catalogued by these compressional wave and shear wave tracings. Hence, another use of shear wave logging is to determine the lithological properties of formations by comparing traces with catalogued standard tracings.

Since shear wave data is useful and shear waves tend to have a small amplitude in comparison with compressional waves, it is desirable to enhance the shear waves.

It has been discovered that shear waves can be enhanced by being introduced into the wall of a formation borehole at an angle, rather than normal to such wall. In fact, some angles of incidence greatly enhance shear wave amplitude propagation. One suitable structure for introducing acoustic energy at an angle of incidence to a borehole, although not for shear wave enhancement propagation, is shown in U.S. Pat. No. 3,504,759, Cuberly, wherein a conventional acoustic transducer unit 23 projects its acoustic energy at a rotating reflecting surface 28 to cause the waves to be reflected, as surface 28 is rotated over 360 degrees.

U.S. Pat. No. 3,974,476, Cowles, discloses the use of a conventional acoustic transducer unit 21, which directs its acoustic wave longitudinally toward a single reflecting surface 22. The reflected wave pass out of opening 23 and impinge perpendicularly upon the borehole wall.

U.S. Pat. No. 4,184,562, Bakamjian, discloses the use of a centralized transucer 6 for irradiating a conical reflector longitudinally disposed therefrom so that the reflected waves from the reflector enter peripherally into the adjacent borehole over a range of 360 degrees. The disclosed system does not utilize a stacked piezoceramic transducer element or any other means of optimizing the frequency of operation for enhancing shear wave well logging.

Because the preferred embodiment of the present invention uses a frequency enhancing transducer element comprising in part a stacked array of piezoceramic elements, it is noted that U.S. Pat. No. 3,539,980, Massa, does disclose an electroacoustic transducer for producing sound waves including a plurality of stacked piezoceramic elements 24-27, and a vibrational plate 28 for unspecified material located at one end and an inertial mass 29 at the other. The patent does not relate to well logging and does not disclose an optimum frequency for such use or how to produce a desirable frequency by changing the dimensions of the elements, the vibrational plate or the inertial mass.

It is therefore a feature of the present invention to provide an improved apparatus useful in well logging, and particularly with respect to shear wave well logging, including a transducer having stacked piezoceramic rings and a metallic end piece which can be modified to produce a desirable frequency, and a downstream omnidirectional reflector for irradiating the adjacent borehole with selectable collimated, focused or dispersed acoustic energy at a desirable and selectable angle of incidence, all of which enhances the production of shear wave components in a borehole.

It is another feature of the present invention to provide an improved apparatus of similar construction as a receiving transducer.

SUMMARY OF THE INVENTION

The transmitting transducer disclosed herein includes, in a well-logging tool, an array of piezoceramic rings with a vibrational metallic plate for inducing an acoustic wave longitudinally within the tool at a frequency somewhat lower than normally employed in acoustic well logging. Spaced therefrom along the longitudinal axis is a conical reflecting surface for causing the acoustic wave directed thereat to be reflected omnidirectionally at an impinging angle with respect to the borehole to enhance the shear wave components. The frequency can be changed by varying the number and size of the rings and the size of the plate. The reflecting surface can be straight to reflect the waves therefrom in a collimated fashion, or can be concave to focus the waves or convex to disperse them.

A receiving transducer of similar construction can be located at a position within the logging tool that is spaced from the transmitting transducer. The receiving transducer is particularly sensitive to the same frequency and waveform of the components introduced into the formation by the transmitting transducer.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only preferred embodiments of the invention and are therefore not to be considered limiting of its scope, for the invention may admit to other equally effective embodiments.

In the Drawings.

DESCRIPTION OF THE PREFERRED EMBODIMENTS

Figure 1:
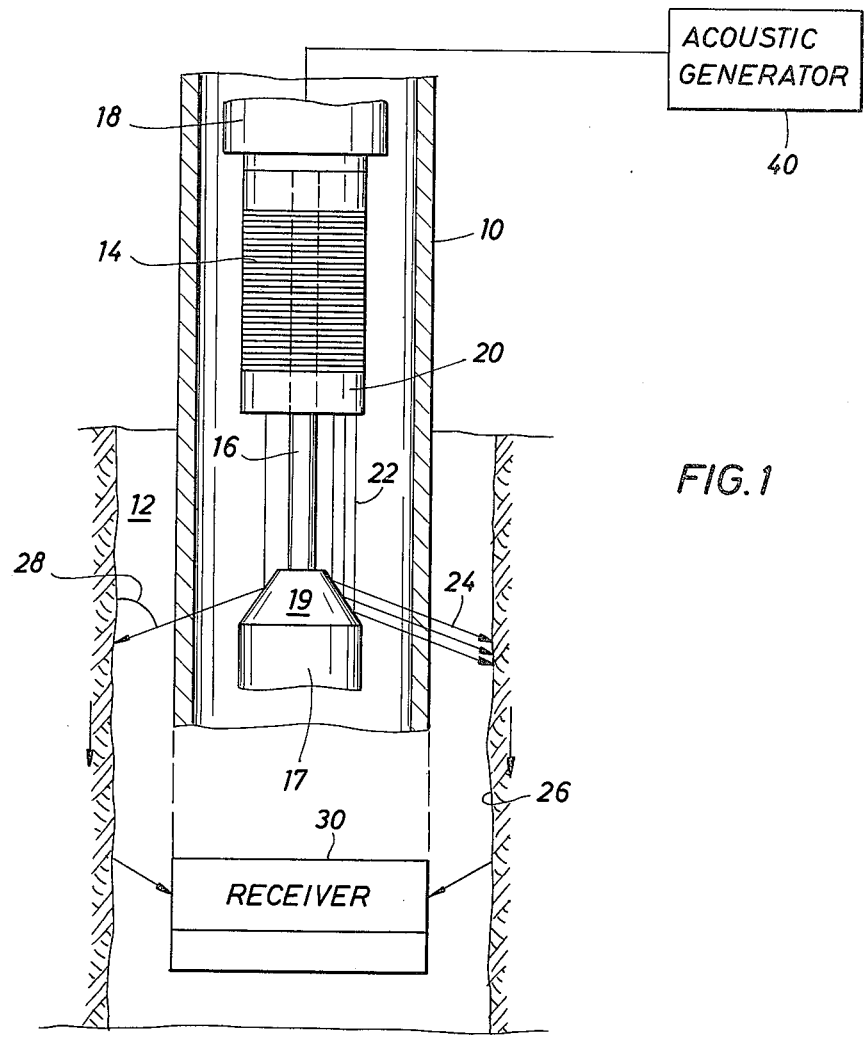
FIG. 1 is a schematic block representation of a well-logging tool incorporating a preferred embodiment of the present invention.

Now referring to the drawings and first to FIG. 1, an acoustic logging tool or sonde 10 in accordance with the present invention is shown lowered into a borehole 12 via a mechanism (not shown) which may be of any kind that is common in the art. Normally, this mechanism includes a suitable wireline for supporting the tool, providing its raising and lowering, and including signal and power conductors for providing necessary power and for providing control signals to the instrumentation housed in the tool and for transmitting the received or detected signals to the surface for surface processing. The tool carries within its housing a transmitting transducer comprising two main parts: (1) an array of piezoceramic rings 14 stacked over a mechanical support or core 16 and (2) a reflector 17. At either end of the array of the rings is an inertial mass or end piece. Upper end piece 18 is typically made of steel and lower end piece 20 is typically made of aluminum.

The core material is a non-reflecting structure that does not interfere with the electrical or magnetic flux operation of the transducer rings. Additional components can be included, if desired, to complete the stacked ring transducer structure. One example of such a transducer is disclosed in U.S. Pat. No. 3,539,980, Massa. Some of the design criteria are discussed in an Engineering Report of Vernitron Piezoelectric Division TP-235 entitled "The Design of Piezoelectric Sandwich Transducers" issued Apr. 31, 1972. Both of these references are incorporated herein by reference for all purposes.

In any event, the operating characteristics of the transducer is determined by selecting the number of rings, by selecting their width dimensions and by selecting the width dimension of end piece 20. In a preferred operating mode, these components are selected to operate the transmitting transducer at an operating frequency below the usual operating frequency for an acoustic log transmitting transducer of about 15 kHz. The range of frequencies that is suitable for operating in accordance with the structure set forth hereinabove is between 3 and 15 kHz.

Reflector 17 is positioned with respect to the array by being spaced apart therefrom as determined by its position on support or core 16. Reflector 17 includes a frustoconical surface 19 opposing the longitudinal directed rays emanating from end piece 20 connected to the stacked rings of the array. Hereinafter, surface 19 is referred to as a conical surface, although its surface can be concave or convex, if desired, as hereinafter explained. Preferably, surface 19 is made of an acoustic reflective material, such as aluminum or steel.

Rays 22 are reflected in multi-directions from surface 19 and are reflected at an angle thereto so that the reflected rays 24 impinge upon and enter wall 26 of the borehole at an angle of incidence 28 thereto. This angle is selected to enhance one or more particular components in the impinging ray. For example, it is common practice to induce or establish both compressional and shear waves into a formation, the shear wave normally being smaller in size. By causing the impinging angle to be at just the right angle, the established shear wave component is made larger than otherwise and its detection is more faithfully made with respect to the presence of all its cycles. It is not uncommon in conventional prior art systems to fail to detect shear wave components because they are so heavily attenuated. This phenomenon is virtually avoided by the arrangement herein.

The surface curvature is uniform about a central, longitudinal axis of logging tool 10 so that the waves reflected therefrom are reflected uniformly at the same angle of incidence into the borehole over the entire range of 360 degrees. Further, centering means (not shown) are employed to maintain tool 10 in a center position within the borehole so that the reflecting surface does not become nearer to the borehole on one side than on the other.

As is shown in FIG. 1, the reflected wave front from reflector surface 19 is uniform, or, in other words, the individual waves in the wave front progress in collimated, parallel fashion into the borehole.

Figure 2:
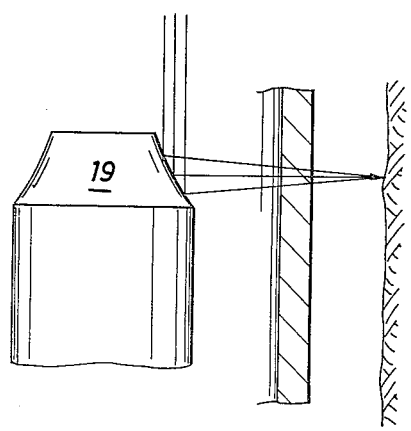
FIG. 2 is an alternate reflector employed in the well-logging tool illustrated in FIG. 1.
Figure 3:
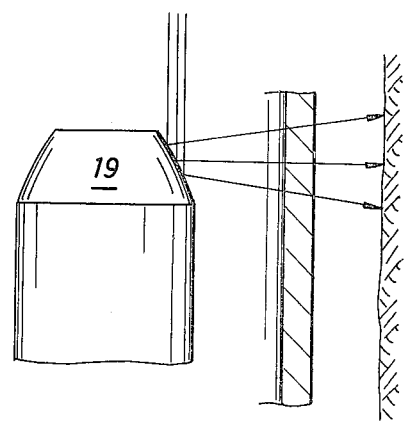
FIG. 3 is another alternate reflector employed in the well-logging tool illustrated in FIG. 1.

In certain situations, it is desirable to cause the wave front to converge at the point of contact of the impinging wave front at the surface of the wall of the borehole or at some other convergent point. This is readily accomplished by concave shaping of the curvature of surface 19, as best shown in FIG. 2. In other situations, it is best that the wave front be dispersing at the time it enters the wall of the borehole, rather than being parallel or converging. Again, this is done by a slight convex shaping of the curvature of surface 19, as shown in FIG. 3.

In all events, the wave that is introduced into the formation following modifications resulting from liquid/solid interfaces, and other anomalies in the travel path, is detected at one or more receivers 30 spaced longitudinally in logging tool 10 at a distance from the transmitting transducer.

The transmitting logging tool just described can be excited by any convenient manner via the acoustic generator 40 connected thereto. Conveniently, however, it is possible to excite the transducer array with alternate pulsing and a gated sine wave excitation (i.e., a tone burst interspersed with a burst of sine wave). This type of excitation has proven very helpful in producing waves suitable for enhancing and distinguishing between compressional wave components and shear wave components, and logging the results obtained thereby simultaneously. The reflected and/or refracted waves detected by receiver or receivers 30 is logged in a conventional fashion to produce, for example, a log of travel time or Δt's or a variable intensity record. Recording means are well known in the art for this purpose.

The logging tool can also comprise a receiving transducer of similar construction to that just described. For example, a transducer arrangement inverted from that illustrated in FIG. 1 would suitably receive multidirectionally from the formation wave components at an angle that enhances the shear wave components. The reflections longitudinally from the reflecting surface comparable to reflecting surface 19 are detected by enhancing vibrations in the end piece connected to the receiving piezoceramic array at the frequency carrying the shear wave component information.

While particular embodiments of the invention have been shown and described, it will be understood that the invention is not limited thereto, since modifications may be made and will become apparent to those skilled in the art.

What is claimed is:

1. A transmitting transducer for multi-directionally impinging transmitted acoustic energy into the borehole wall from a well-logging tool at preselected angles to the borehole axis for enhancing shear wave components affected by introduction of acoustic energy at such angles, comprising
    a stacked array of piezoceramic rings for determining a primary frequency of operation,
    at least one vibrating end piece connected to said stacked array positioned for transmitting acoustic energy longitudinally with respect to the borehole axis,
    an acoustic energy reflector spaced apart from said vibrating element for receiving the longitudinally transmitted energy therefrom and reflecting said energy simultaneously in multi-directions substantially completely circumferentially into the borehole wall at a preselected angle with respect to the borehole axis, and
    transducer excitation means for alternately providing impulse excitation and gated sine wave excitation to said stacked array, thereby particularly enhancing shear wave components of acoustic energy.

2. A transmitting transducer in accordance with claim 1, wherein the number and thickness of individual rings in said stacked array and the thickness of said end piece are selected to determine a frequency of operation below 15 kHz.

3. A transmitting transducer in accordance with claim 1, wherein the number and thickness of individual rings in said stacked array and the thickness of said end piece are selected to determine a frequency of operation between 3 and 15 kHz.

4. A transmitting transducer in accordance with claim 1, wherein said reflector has a reflecting surface for converging the reflections therefrom.

5. A transmitting transducer in accordance with claim 1, wherein said reflector has a reflecting surface for reflecting the reflections therefrom approximately along parallel paths.

6. A transmitting transducer in accordance with claim 1, wherein said reflector has a reflecting surface for dispersing the reflections therefrom.

7. The transmitting transducer of claim 1 and further including, in combination, a receiving transducer comprising a similarly configured and tuned transducer array to the transmitting transducer of claim 1, said receiving transducer being longitudinally spaced from said transmitting transducer and oriented with its corresponding acoustic energy reflector nearest in longitudinal spacing to said transmitting transducer.

* * * * *